United States Patent
Millios

(10) Patent No.: US 7,909,457 B2
(45) Date of Patent: Mar. 22, 2011

(54) EYEWEAR ASSEMBLY FOR ATTACHMENT TO HEADWEAR

(76) Inventor: Peter Pantelos Millios, Townsville (AU)

(*) Notice: Subject to any disclaimer, the term of this patent is extended or adjusted under 35 U.S.C. 154(b) by 127 days.

(21) Appl. No.: 12/230,591

(22) Filed: Sep. 2, 2008

(65) Prior Publication Data
US 2010/0014046 A1    Jan. 21, 2010

(30) Foreign Application Priority Data
Jul. 18, 2008 (AU) .............................. 2008203207

(51) Int. Cl.
*G02C 3/00* (2006.01)
(52) U.S. Cl. ........................................... 351/155; 2/453
(58) Field of Classification Search .................. 351/155, 351/158, 41; 2/10, 453
See application file for complete search history.

(56) References Cited

U.S. PATENT DOCUMENTS

| 4,869,586 | A | * | 9/1989 | Chung | 351/158 |
| 5,056,164 | A | * | 10/1991 | Lisle et al. | 2/453 |
| 5,687,420 | A | * | 11/1997 | Chong | 2/10 |
| 5,692,234 | A | * | 12/1997 | Yuen | 2/10 |
| 6,275,992 | B1 | * | 8/2001 | Bondy | 2/10 |
| 6,948,812 | B2 | * | 9/2005 | Wichner | 2/10 |
| 7,125,116 | B1 | * | 10/2006 | Chiu | 351/155 |
| 7,147,323 | B1 | * | 12/2006 | Wu | 351/155 |
| 7,207,673 | B1 | * | 4/2007 | Ho | 351/155 |

FOREIGN PATENT DOCUMENTS
WO    WO 96/28986    9/1996

* cited by examiner

*Primary Examiner* — Hung X Dang
(74) *Attorney, Agent, or Firm* — Stein McEwen, LLP

(57) ABSTRACT

An eyewear assembly for attachment to headwear such as a sun hat, the headwear including a main body and a visor, the eyewear assembly including at least one eyewear member, at least one mounting means to attach the set of eyewear to the headwear and a pair of rotation mechanisms associated with the mounting means and the eyewear to movement relative to the at least one mounting means between a use position in front of a wearer's eyes and a stored position adjacent the visor of the headwear.

11 Claims, 5 Drawing Sheets

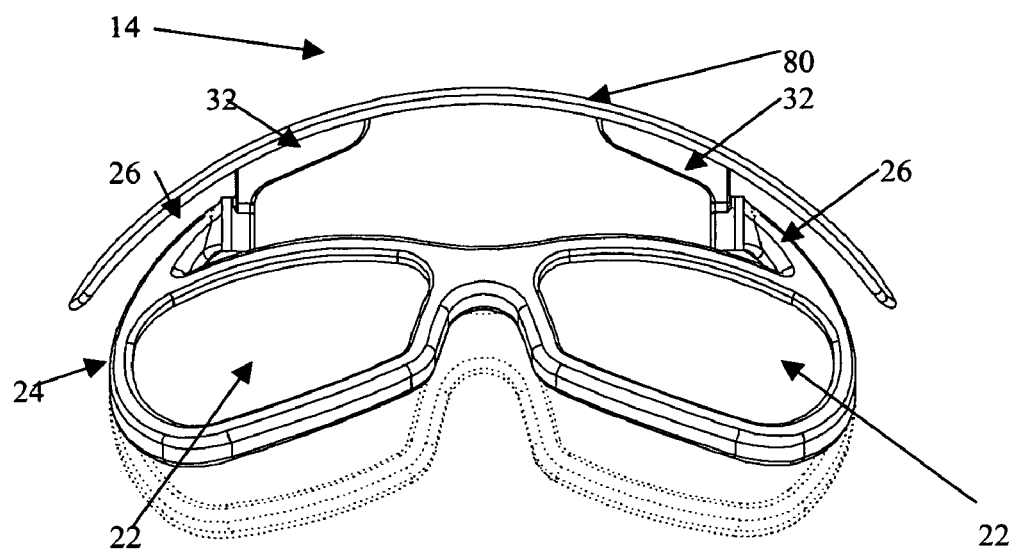
Fig-1-
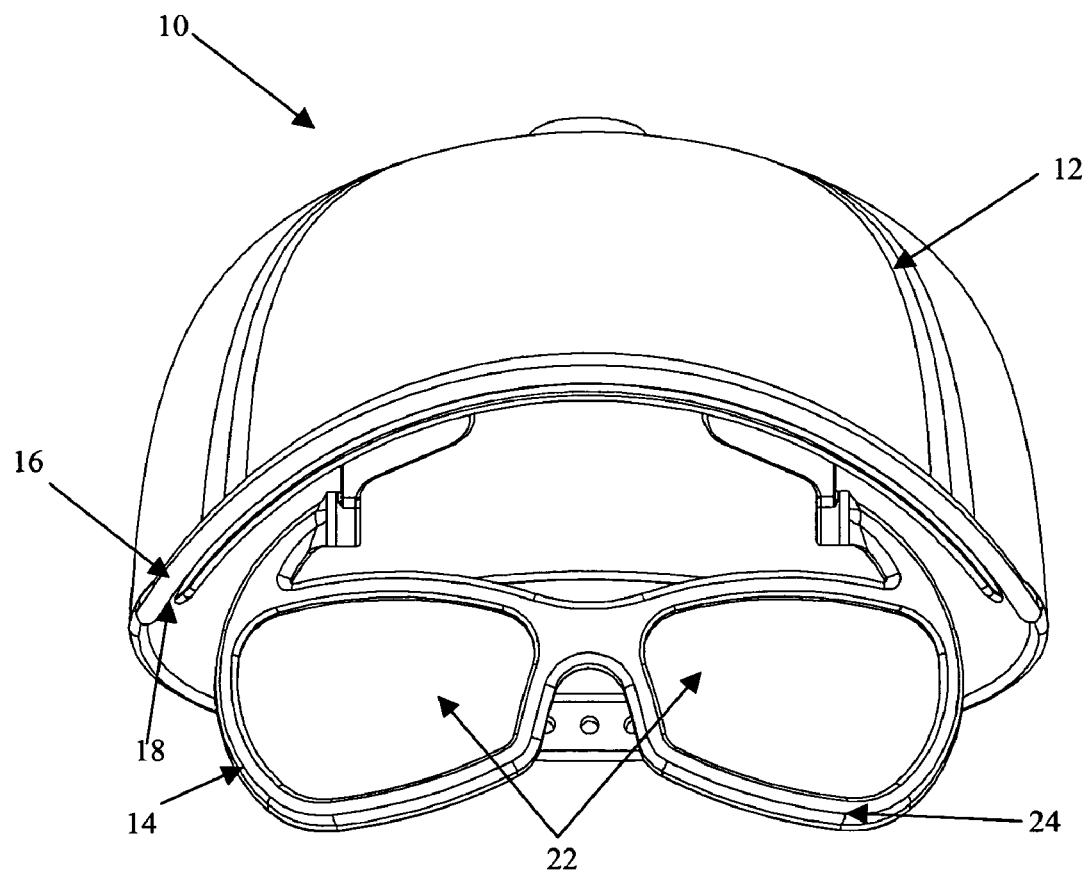
Fig-2-

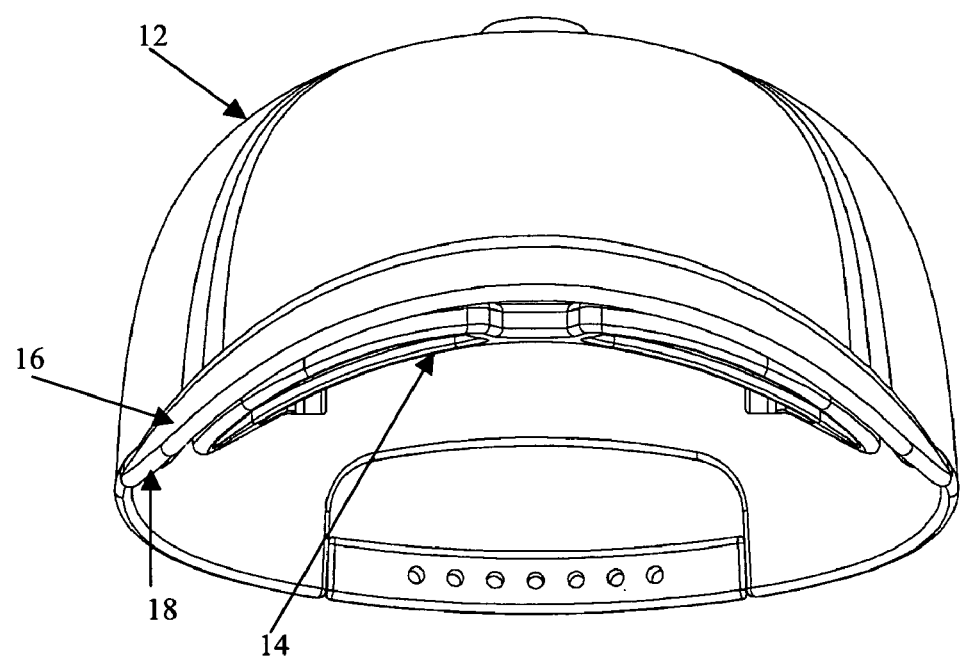
Fig-3-
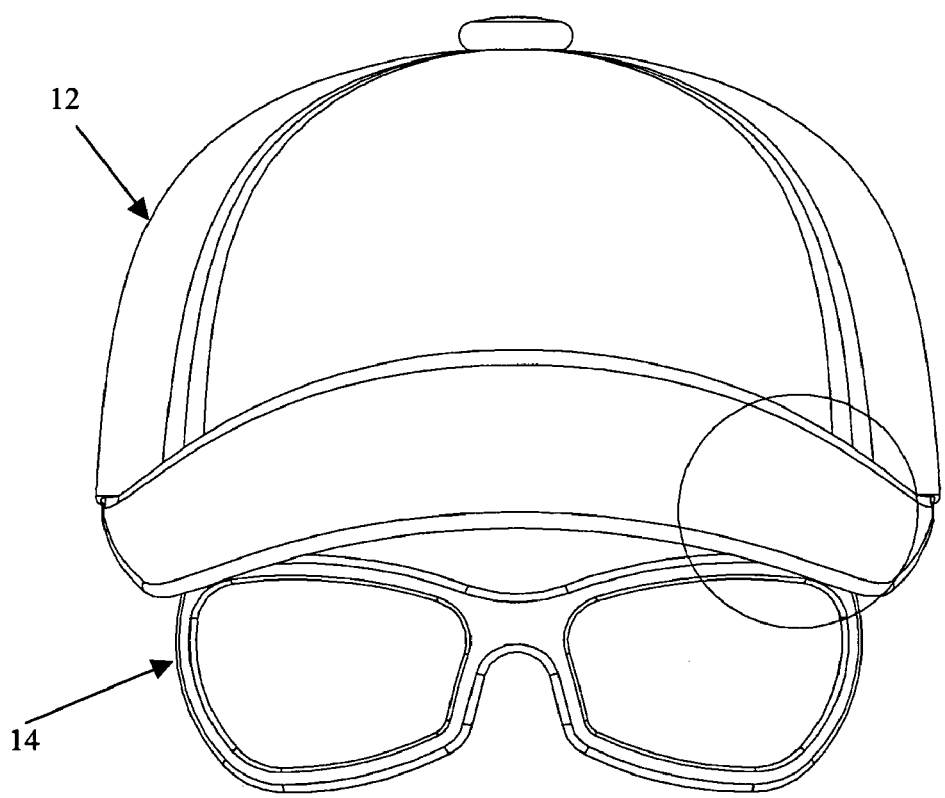
Fig-4-

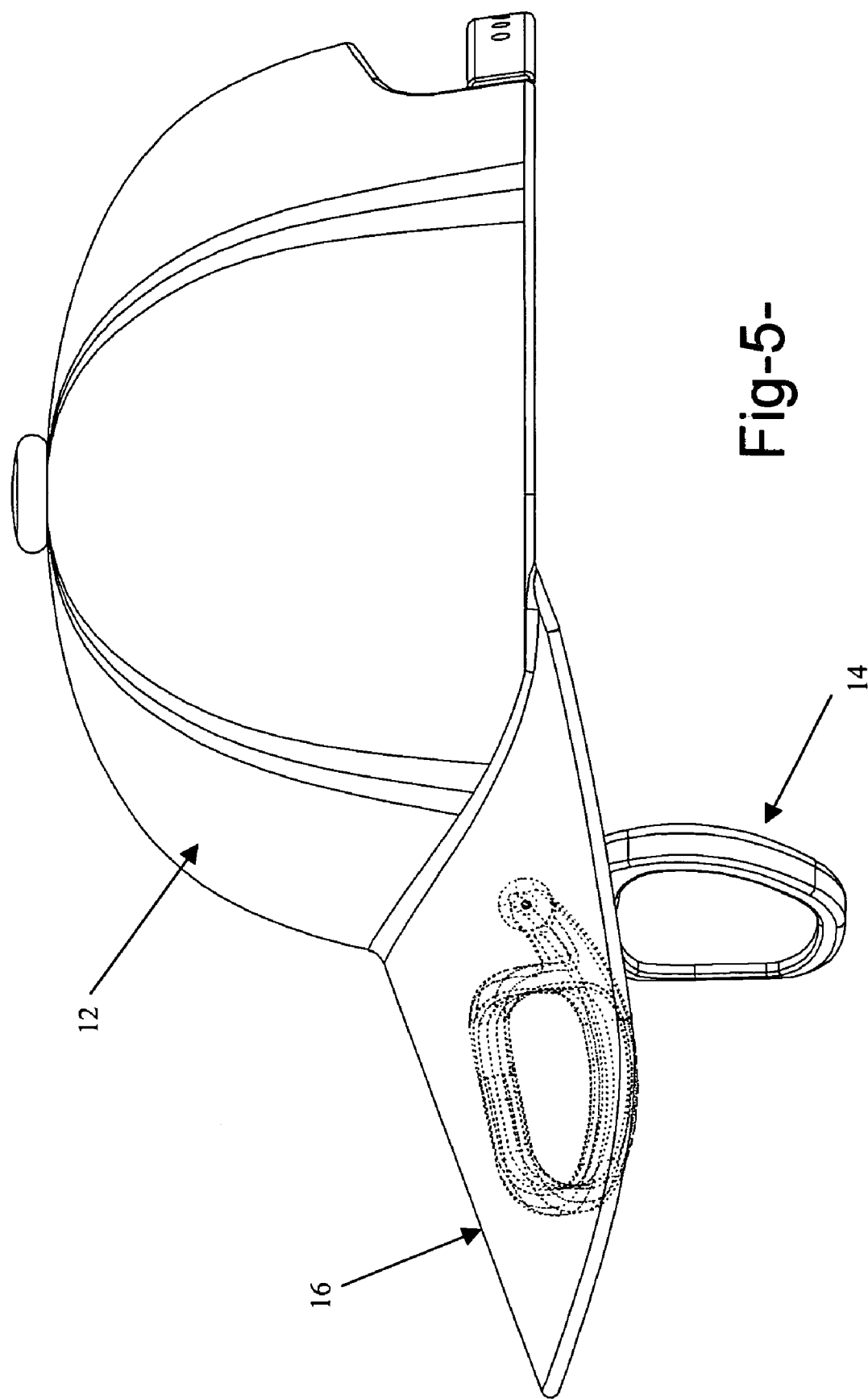
Fig-5-

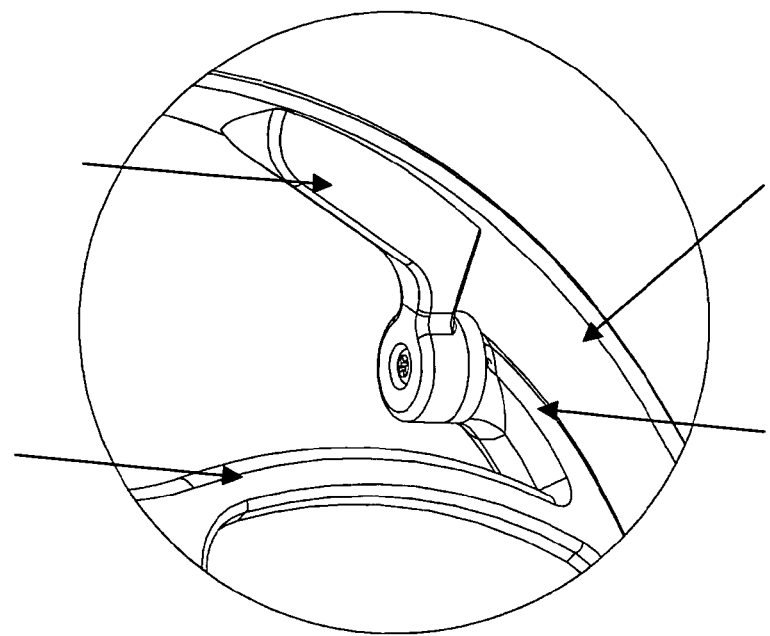
Fig-6-
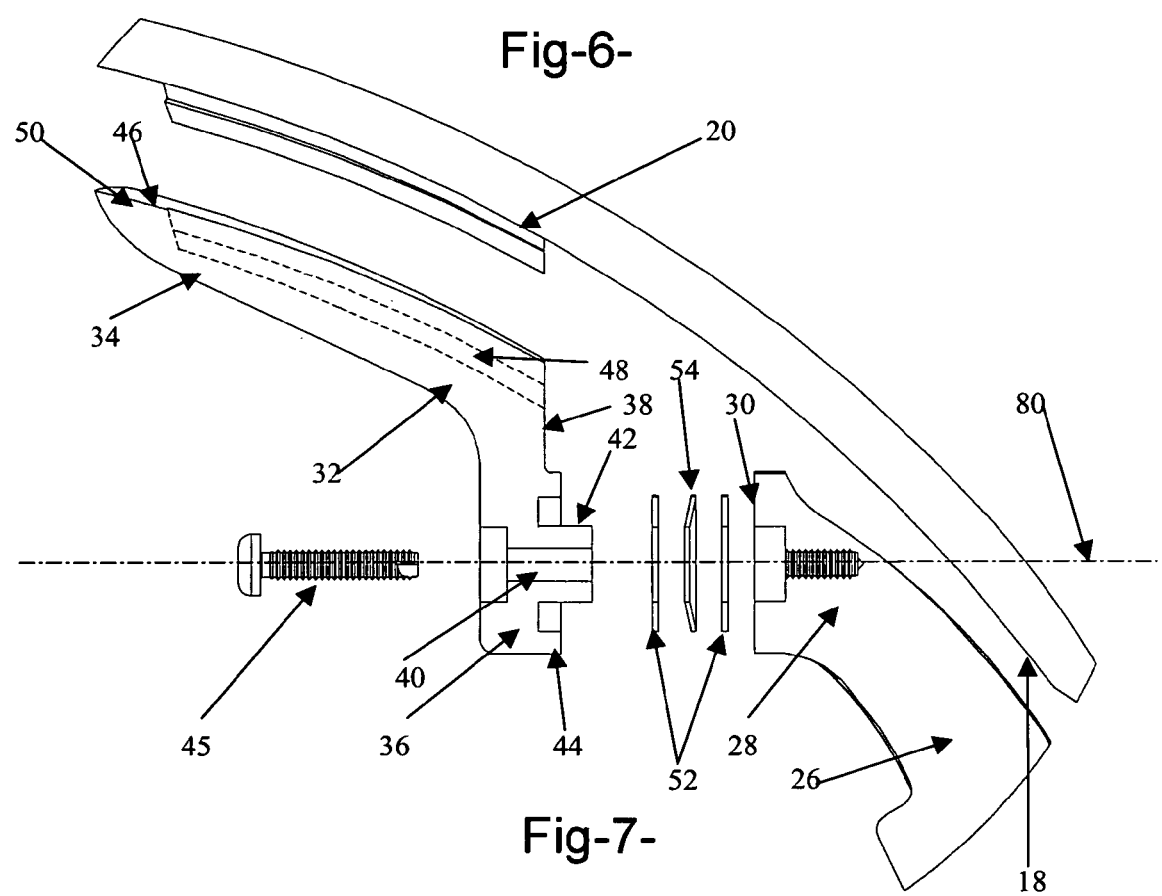
Fig-7-

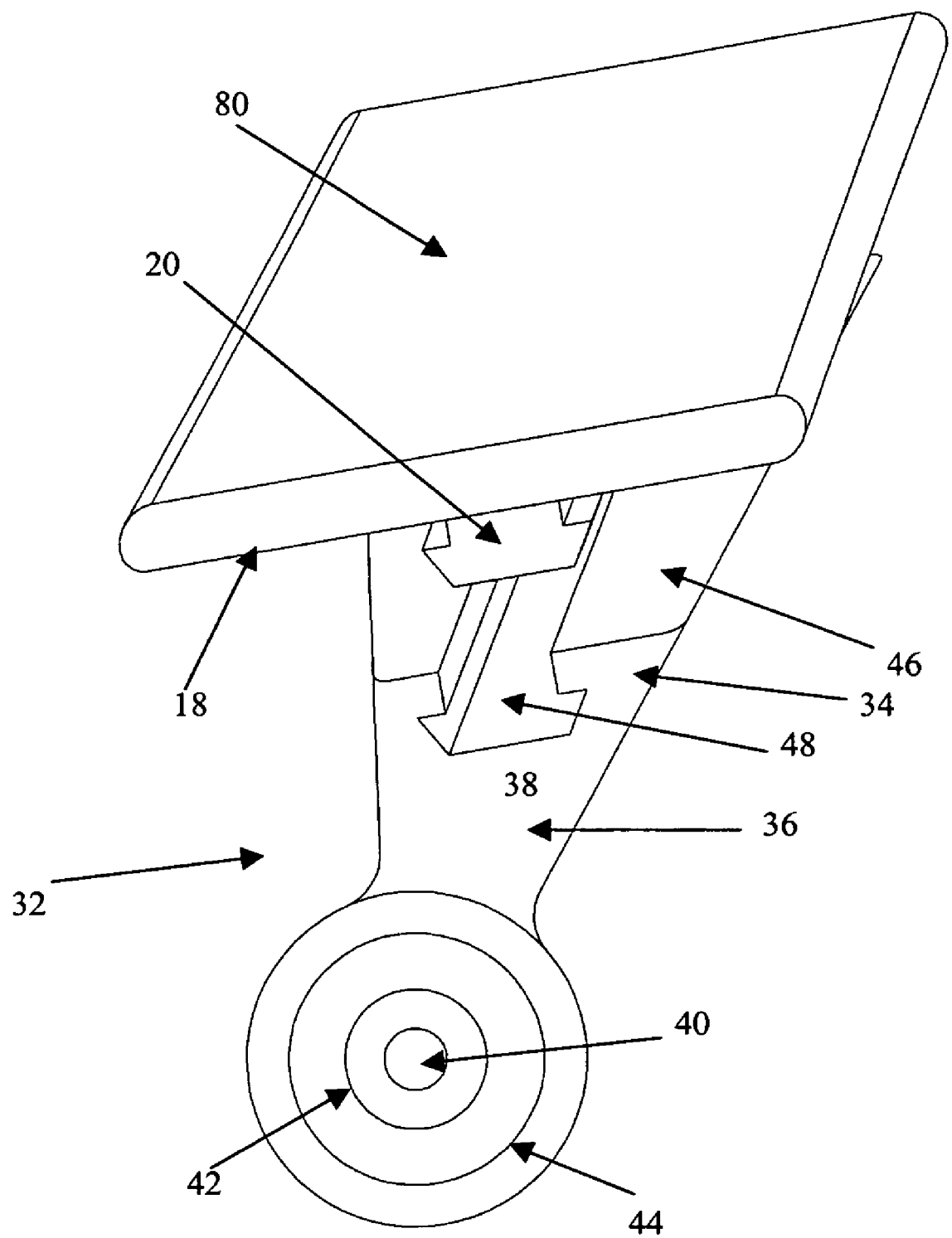
Fig-8-

EYEWEAR ASSEMBLY FOR ATTACHMENT TO HEADWEAR

FIELD OF THE INVENTION

The present invention relates to eyewear with a mount to attach to a sunhat or to a sunhat with eyewear, more particularly one whose eyewear can be, when not in use, pivoted so as to be close to a lower side of the visor thereof.

BACKGROUND OF THE INVENTION

People usually wear hats to block direct sunlight and prevent heatstroke when taking a walk or doing outdoor exercises. Furthermore, people usually wear sunglasses to protect the eyes from the sun's damaging rays.

When people get indoors and take off the sunglasses, they can put the sunglasses in their clothing pockets, on top of their hats or in their handbags. No matter which one of the above ways is used, there is risk of the sunglasses getting damaged. Further, the sunglasses are prone to fall off if they are positioned on top of hats.

Other inventors have attempted to produce devices in order to provide consumers with at least a partial solution to the abovementioned problems. For example, the inventor in International Patent Application No. WO 96/28986 provides a hat body adapted to be fitted over the scalp of a wearer and having a flexible head band to engage about the forehead of the wearer. The hat has a brim affixed adjacent the head band with a portion projecting forwardly in use in front of and above the wearer's eyes. The invention of this prior art article was said to lie in that there is secured to the head band beneath the front brim portion a flexible tinted sunglass sheet adapted to be arranged in operative disposition substantially upright and arcuately around the front of the head band in front of the wearer's eyes when the hat body is fitted over the wearer's scalp, and the tinted sunglass sheet is so shaped and so secured at its upper edge to the flexible head band that upon removal of the hat body, the sunglass sheet and head band may be flexed to permit the sunglass sheet to be moved flexibly in the rearwards direction from said operative disposition to a stored inoperative disposition within the hat body in which the sunglass sheet will extend upwards from the head band and be held adjacent the scalp when the hat body is re-fitted to the wearer.

According to this device, the sunglass sheet is fixed to the hat which results in the sunglass being moveable between only two positions, namely the position in front of a wearer's eyes and the inoperative storage position, both positions determined according to the location of the headband to which the sunglass sheet is attached.

Further, the sunglasses of the prior art are fixed to the hat so that if a user wears a different hat, there may be no sunglasses with the second hat.

The present invention is therefore directed toward providing a set of eyewear which are removably attachable to a hat and which may be adjustable in their position both relative to the hat and relative to a user's face.

SUMMARY OF THE INVENTION

It is a main object of the invention to provide a set of eyewear with a mount to attach to a sun hat to overcome the abovementioned problems.

In one form, the invention resides in an eyewear assembly for attachment to headwear such as a sun hat, the headwear including a main body and a visor, the eyewear assembly including at least one eyewear member, at least one mounting means to attach the set of eyewear to the headwear and a pair of rotation mechanisms associated with the mounting means and the eyewear to movement relative to the at least one mounting means between a use position in front of a wearer's eyes and a stored position adjacent the visor of the headwear.

There will typically be two main parameters for properly or ideally locating the eyewear relative to a user's face, namely the spacing between the eyewear and the face and the angle of the eyewear relative to a user's face.

The article of headwear may itself be a hat, cap or partial cap, with the head band being discontinued at the rear to be replaced by adjustable connecting straps for example. Also the brim may be of continuous annular form in the case of a hat or it can be provided at the front only in the case of a cap. In the latter case, the hat body may be in the form of a cup-like baseball-type cap body having a front stiffened, but flexible, visor or brim.

The visor or brim will preferably be arcuate. The visor for a cap will typically have side edges and a front edge but there will generally not be a clear delineation between the two due to the curvature of the visor. The side edges will generally extend forwardly of the main body of the cap and typically from a base edge of the main body of the cap. The side edges are generally in the same plane as the base edge of the main body of the cap. As the side edge extends forwardly, the edge typically curves upwardly and inwardly to form the front edge of the visor.

Preferably, the set of eyewear may be or include a unitary tinted sunglass sheet. This sunglass sheet is typically made from sheet material of uniform thickness, being of elongated form and symmetrical to each side of a middle nose-bridging portion. The eyewear-shaped portions will preferably have curved lower edges at each side of the nose-bridging portion. In one embodiment, the flexible tinted sunglass sheet has resilient cheek-contact members fitted to the lower edges of both eyewear-shaped portions. The flexible tinted sunglass sheet may also have a resilient nose-contact member fitted to the lower edge of the nose-bridging portion, the resilient contact members preferably being made of foam rubber.

In the alternative, the set of eyewear may be formed with two separated eyewear members supported by a frame and a central nose-bridging portion. The frame may surround each of the eyewear members.

The eyewear may be or include corrective eyewear or safety glasses to protect the eye from flying debris. Although safety lenses may be constructed from a variety of materials that vary in impact resistance, certain standards suggest that they maintain a minimum 1 millimetre thickness at the thinnest point, regardless of material. Safety glasses can vary in the level of protection they provide. For example, those used in medicine may be expected to protect against blood splatter while safety glasses in a factory might have stronger lenses and a stronger frame with additional shields at the temples. The lenses of safety glasses can also be shaped for correction.

Some safety glasses are designed to fit over corrective glasses or sunglasses. They may provide less eye protection than goggles, face shields or other forms of eye protection, but their light weight increases the likelihood that they will actually be used.

Preferably, the pair of eyewear will not include a pair of earstems extending rearwardly from the face frame as these may impede the movement of the glasses.

According to a particularly preferred embodiment of the invention, the flexible tinted sunglass sheet is preferably formed by cutting same from a sheet of polycarbonate material, the sunglass sheet suitably having a thickness between 0.25 mm and 0.5 mm.

The mounting system of the present invention will include at least one mounting means to mount the eyewear relative to the headwear and a pair of rotation mechanisms (one located to either lateral side of the frame) suitable to attach the frame of the glasses (and thereby, the glasses themselves) to the mounting means for movement.

In this manner, the mounting means (and the attached eyewear) can be positioned on the headwear at an appropriate position to correctly space the eyewear from a user's face, and then attached to the headwear with the rotation mechanisms allowing movement of the eyewear between a storage condition wherein the glasses are away from the user's face and a use condition in which the glasses are in front of a user's eyes.

Each mounting means will therefore preferably include three main components, namely mounting portion to support the eyewear relative to the headwear and an attachment and rotation mechanism on either lateral side of the frame of the eyewear for securing the eyewear relative to the mounting portion.

Preferably, the mounting portion will be attachable to the headwear and will support at least one of the attachment and rotation mechanisms. According to the invention, two alternative embodiments are preferred.

According to the first preferred embodiment a single, unitary mounting portion is provided to support both attachment and rotation mechanisms.

According to this embodiment, the mounting portion is preferably an arcuate member. The mounting portion will typically be either attachable to the underside of a visor, or attachable to the upper side of a visor with the attachment and rotation mechanisms suspended beside the visor to properly position the eyewear relative to a user's eyes, or to a headband or similar portion of the headwear rather than to the visor.

Regardless of which part of the headwear the mounting portion attaches, it is preferred at the entire length/width of the unitary member abuts the headwear when attached.

The attachment means may be provided in any form including for example adhesive attachment, clips, buttons or hook and eye fasteners such as Velcro®. As will be relatively clear from the preceding statement, the attachment method or means may be temporary or permanent. For example using an adhesive will typically result in the attachment being more or less permanent and the use of hook and eye fasteners such as Velcro® will be a temporary attachment method.

The mounting portion may preferably be provided with one or more grip portions to allow for easy placement and/or removal of the mounting portion.

According to the second preferred embodiment, a pair of mounting portions are provided, each mounting portion supporting one attachment and rotation mechanism.

According to this embodiment each of the mounting portions may have any of the features outlined above in respect to the first preferred embodiment. According to this embodiment however the mounting portions will typically be discreet and not linked to one another except through the means of the eyewear. The mounting portions of this embodiment may be used in a manner similar to the unitary mounting portion but will typically find application with lighter weight or less bulky headwear in particular.

There is typically a pair of attachment and rotation mechanisms provided. Each of the attachment in rotation mechanisms are typically formed from at least two main components, namely a fixed component or attachment body which is attached to the mounting portion and a rotatable component or arm which is attached to the eyewear (or frame) and ease rotatably associated with the fixed component.

Typically, the attachment body will be attached to the mounting portion using a retention means allowing for at least temporary attachment. The retention means may be provided with a shoulder portion standing proud of the mounting portion surface and which is receivable in a channel provided in the attachment body.

The attachment body typically extends downwardly substantially vertically from the mounting portion. At or adjacent a lower region of the attachment body will typically be a bore or similar which will allow engagement of the attachment body with the arm of the frame in a rotatable manner.

The rotation mechanism provided between the attachment body and the arm will typically rotate about a central axis which may be defined by a fastener or the like which also attaches be arm to the attachment body. One or more wear spacers or washers may be provided between the attachment body and the arm. Preferably a disc or cup spring is also provided between the where spacers or washes.

The washers and spring are preferably provided and maintained in their location and by a boss and sized to fit over the boss. A cover may be provided to ensure all further secure the location of the washers and spring. According to the most preferred embodiment, the cup spring is disposed between two washers.

The spacer washers and cup spring are disposed concentrically around the boss such that one of the washers abuts a face of the attachment body while the other washer abuts a face of the arm. Cup spring is disposed between the washers and when the arm is coupled to the attachment body, the cup spring exerts an axial biasing force along the axis of rotation, such that any rotational motion of arm relative to attachment body must overcome the resistance from the cup spring pressing against the two washers and faces. This mechanism will typically assist in maintaining the eyewear in either the use or storage condition.

In a much more particular form, the invention resides in headwear with an eyewear assembly as described hereinbefore attached thereto.

BRIEF DESCRIPTION OF THE DRAWINGS

The present invention will be better understood by referring to the accompanying drawings, wherein:

FIG. 1 is a front view of the eyewear assembly of a preferred embodiment of the present invention.

FIG. 2 illustrates a front view of the preferred embodiment of the invention showing headwear having glasses pivotally mounted thereto and disposed in a deployed position;

FIG. 3 is a front view of the headwear having the glasses in a stowed position;

FIG. 4 is a front view of an alternative preferred embodiment of the invention showing headwear having glasses pivotally mounted thereto and disposed in a deployed position with the portion identified enlarged in FIG. 6;

FIG. 5 a side view of the headwear having the glasses in a deployed position;

FIG. 6 is an enlarged fragmentary view of the pivoting mechanism shown in FIG. 4;

FIG. 7 is a partial exploded view of the pivoting mechanism; and

FIG. 8 is a partial side view of the attachment base and mounting stud of the pivoting mechanism.

DETAILED DESCRIPTION OF THE PREFERRED EMBODIMENTS

Referring to the drawings, FIG. 1 is an eyewear assembly 14 according to a preferred embodiment.

The eyewear assembly 14 includes a pair of eyewear lens 22 surrounded by a frame 24, a mounting band 80 to attach the set of eyewear to the headwear and a pair of attachment and rotation mechanisms attached to the mounting band to allow the eyewear to move relative to the mounting band between a use position in front of a wearer's eyes as illustrated in FIG. 2 and a stored position adjacent the visor of the headwear as illustrated in FIG. 3.

According to the preferred embodiment illustrated in FIGS. 2 and 3, the headwear 10 includes a main body 12 and a visor 16.

FIGS. 2-5 illustrate a preferred embodiment of headwear 10 with the assembly illustrated in FIG. 1 attached thereto. Headwear 10 is a main body 12 with an eyewear assembly 14 attached thereto for use. The main body 12 of the headwear has a forwardly extending brim or visor 16 that projects from the front of the main body 12.

Visor 16 is curved so that the underside 18 of the visor forms a generally concave shape away from a user's face. Visor 16 is formed from a thermo-set or thermo-plastic material that is relatively flexible, but will hold a pre-set or molded shape. Additionally, the plastic material of visor 16 allows the visor to be slightly deformed, yet will cause the visor to return to the original molded shape.

The eyewear assembly 14 is preferably formed as sunglasses, but other types of eyewear may be used instead. Eyewear 14 has at least one lens 22 that are held to a frame 24. Frame 24 has a substantially conventional shape with the exception that the stems of conventional glasses are replaced with a pair of shortened arms 26 that project from opposite sides of frame 24.

As shown best in FIGS. 6 to 8, each arm 26 projects up and away from frame 24. Further, each arm 26 terminates at a generally cylindrical end 28. Ends 28 are positioned such that faces 30 are parallel to each other and cylindrical ends 28 are axially aligned. Arms 26 are preferable integrally formed with the rest of frame 24, but may be coupled to the frame in a conventional manner.

The eyewear assembly 14 also includes a pair of attachment bodies 32. Each body 32 includes a generally flat coupling portion 34 and a pivot arm 36 that extends from one end of portion 34.

Pivot arm 36 projects away from coupling portion 34 and includes a flat outer face 38. A through-bore 40 passes through arm 36 perpendicular to face 38. An annular wall or boss 42 extends from face 38 concentric to bore 40. A second outer annular wall or cover 44 also extends from face 38 concentric to boss 42 and bore 40. In the preferred embodiment, boss 42 extends further from face 38 than cover 44. Additionally, bore 40 may be enlarged at the end opposite to face 38 to allow the head of a fastener 45 to be countersunk within the arm 36.

Further, portion 34 of attachment body 32 has a flat upper surface 46 that has a recessed channel 48. Channel 48 passes through face 38 and is shaped complementary to retention stud 20 and is sized to slidably receive stud 20. Channel 48 terminates prior to passing completely through the length of portion 34, leaving a stop portion 50.

As shown in FIG. 7, the eyewear assembly 14 also includes a pair of wear spacers or washers 52 and a disc or cup spring 54. The washers 52 and spring 54 are sized to fit over boss 42 and within cover 44. Cup spring 54 is disposed between the two washers 52.

Attachment blocks 32 are pivotally coupled to the two arms 26 at their respective cylindrical ends 28 by a conventional fastener 45, such as a self-tapping screw, that passes through bore 40 and into face 30. The spacer washers 52 and cup spring 54 are disposed concentrically around boss 42 such that one of the washers abuts face 38 while the other washer abuts face 30. Cup spring 54 is disposed between the washers and when arm 26 is coupled to pivot arm 36 by fastener 45, cup spring 54 exerts an axial biasing force along the axis of rotation 55, such that any rotational motion of arm 26 relative to attachment body 32 must overcome the resistance from the cup spring pressing against the two washers 52 and faces 30, 38.

The washers 52 are formed from a strong wear-resistant material, such as steel and are effective to receive the pressure exerted by spring 54 and transfer that pressure to the faces 30, 38 without deforming. In the preferred embodiment, fastener 45 is fixedly coupled to arm 26 and pivots with arm 26 (and frame 24) about the centreline of bore 40.

Pivot arms 36 project from body 32 at an angle such that, when body 32 is coupled to retention stud 20, face 38 is substantially vertical and bore 40 is horizontal (relative to the ground when headwear 10 is worn in a conventional manner).

Attachment bodies 32 are removably coupled to the two retention studs 20 by sliding each of the bodies 32 in an inside-out direction, such that the stud 20 passes through the T-shaped channel 48 opening in face 38. Body 32 is slid along stud 20 until the end of stud 20 abuts stop 50.

It should be appreciated that the molded curve of visor 16 and its co-extensive retention studs 20 cooperate with the opposite facing openings of channels 48 to create a constant pressure between studs 20 and attachment bodies 32 thereby holding glasses 14 to cap 12. That is, as best shown in FIGS. 2 and 3, visor 16 and frame 24 are both curved or arcuate and in one embodiment, the radius (relative to a point below the visor) of visor 16 is smaller than the radius of the arcuatly-shaped spectacle frame 24. Further, studs 20 are spaced apart a distance that is slightly less than the distance between stops 50. In this manner, the arcuate shape of visor 16 and frame 24 cause frame 24 to be compressed and visor 16 (through studs 20) is in tension.

Spring 54 exerts axial force against the pivoting portions (i.e., arms 26, 36) to sufficiently increase the frictional resistance to rotational movement to hold the arms 26 and frame 24 in substantially any selected position. As shown in FIGS. 1 and 3, this position can be a deployed position where the lenses 22 are disposed in front of a user's eyes (when headwear 10 is being worn in a conventional manner). The glasses 14 can be rotated in the direction of arrow 52 to a stowed position shown in FIGS. 3 and 5 where the glasses 14 underlie the visor 16, such that the front-most surfaces of frame 14 and lenses 22 are adjacent underside 18.

In the present specification and claims (if any), the word "comprising" and its derivatives including "comprises" and "comprise" include each of the stated integers but does not exclude the inclusion of one or more further integers.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

What is claimed is:

1. An eyewear assembly for attachment to headwear, the headwear including a main body and a visor, the eyewear assembly including at least one eyewear member, at least one mounting means to attach the set of eyewear to the headwear, the mounting means includes three components, namely a single, unitary mounting portion to support the eyewear relative to the headwear, the mounting portion being arcuate and attachable to an underside of the visor and an attachment and rotation mechanism on each end of the frame of the eyewear for securing the eyewear relative to the mounting portion and to move the at least one eyewear member relative to the at least one mounting means between a use position in front of a wearer's eyes and a stored position adjacent the visor of the headwear, the at least one mounting means being elongate with a pair of rotation mechanisms provided adjacent of each end of the mounting means.

2. An eyewear assembly for attachment to headwear as claimed in claim 1 wherein the set of eyewear includes a unitary tinted sunglass sheet.

3. The eyewear assembly for attachment to headwear as claimed in claim 2 wherein sunglass sheet is of uniform thickness, being of elongated form and symmetrical to each side of a middle nose-bridging portion.

4. The eyewear assembly for attachment to headwear as claimed in claim 1 wherein the set of eyewear is formed with two separated eyewear members supported by a frame and a central nose-bridging portion.

5. The eyewear assembly for attachment to headwear as claimed in claim 1 wherein the eyewear includes corrective eyewear or safety glasses to protect the eye from flying debris.

6. The eyewear assembly for attachment to headwear as claimed in claim 5 wherein the safety glasses are designed to fit over corrective glasses or sunglasses.

7. The eyewear assembly for attachment to headwear as claimed in claim 1 wherein the mounting portion is attachable to the upper side of a visor with the attachment and rotation mechanisms suspended beside the visor to properly position the eyewear relative to a user's eyes.

8. The eyewear assembly for attachment to headwear as claimed in claim 1 wherein each of the attachment and rotation mechanisms is formed from at least two components, namely a fixed component or attachment body which is attached to the mounting portion and a rotatable component or arm which is attached to the eyewear or frame and is rotatably associated with the fixed component.

9. The eyewear assembly for attachment to headwear as claimed in claim 8 wherein the attachment body is attached to the mounting portion using a retention means allowing for at least temporary attachment.

10. The eyewear assembly for attachment to headwear as claimed in claim 1 wherein an attachment means is provided to attach the at least one mounting means to the headwear at least temporarily.

11. The eyewear assembly for attachment to headwear as claimed in claim 1 wherein one or more grip portions to allow for easy placement and/or removal of the mounting means relative the headwear is provided.

* * * * *